July 18, 1939.  J. THERRES  2,166,452
BRAKE CONTROL
Filed March 29, 1938  2 Sheets-Sheet 1

INVENTOR
John Therres
John A. Naismith
ATTORNEY

July 18, 1939. J. THERRES 2,166,452
BRAKE CONTROL
Filed March 29, 1938 2 Sheets-Sheet 2
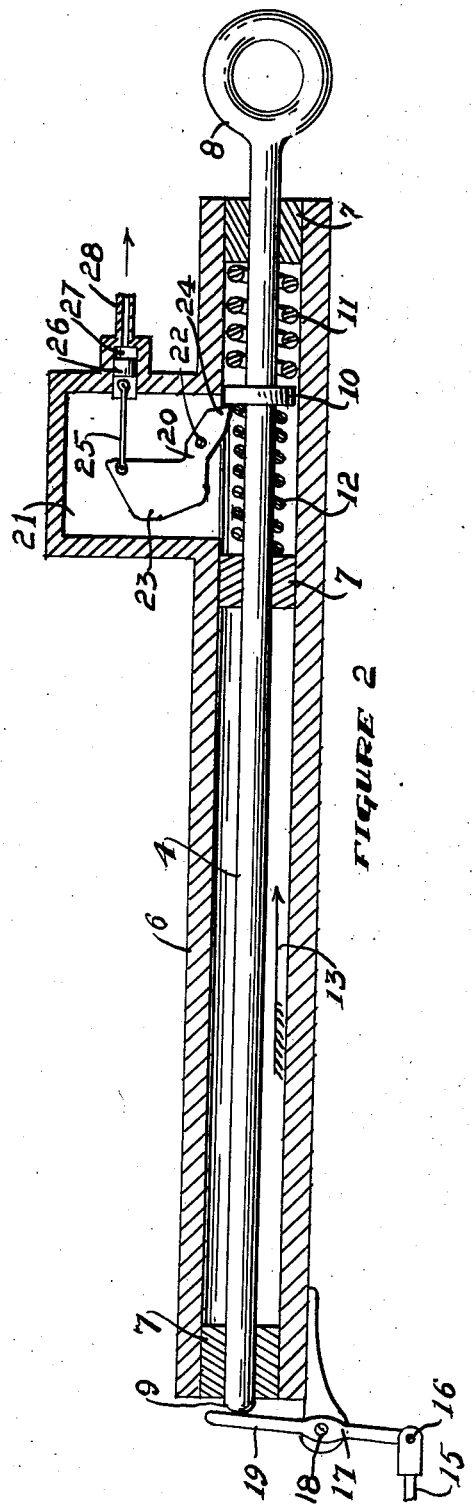
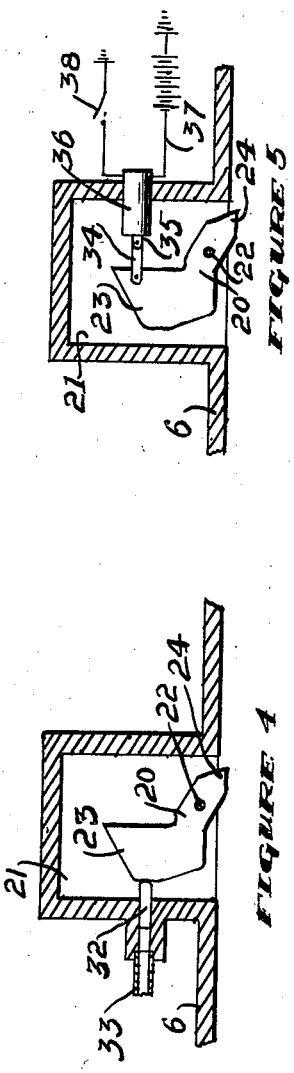
INVENTOR
John Therres
John A. Naismith
ATTORNEY Patented July 18, 1939

2,166,452

UNITED STATES PATENT OFFICE 2,166,452

BRAKE CONTROL

John Therres, Norwalk, Calif.

Application March 29, 1938, Serial No. 198,671

3 Claims. (Cl. 188—142)

The present invention relates particularly to automatically operating means for controlling the brakes of a trailer through its draft connection with a tractor, truck or car of any type. In the following specification the word "tractor" is intended to include any form of vehicle to which a trailer of any kind may be attached by means of a mechanical coupler.

In the operation of a combined tractor and trailer it has heretofore been customary to provide a manual control for the brake system. While such a system is highly efficient within certain limits it does require constant attention upon the part of the tractor operator.

It is one object of my invention, therefore, to provide a brake control for a trailer that will be automatic in operation.

It is another object of the invention to provide a brake control of the character indicated wherein the inertia of a trailer being hauled by a tractor may be utilized to apply brakes when the tractor speed is reduced.

It is also an object of the invention to provide means of the character indicated that will be economical to manufacture, simple in form and construction, strong, durable, and highly efficient in its practical application.

In the drawings:

Figure 2 is a longitudinal sectional view through a portion of a brake control embodying my invention.

Figure 4 is a detail illustration of a portion of a device embodying my invention showing a compressed-air actuated brake lock.

Figure 5 is a detail illustration of a portion of a device embodying my invention showing an electrically actuated brake lock.

Figure 1:
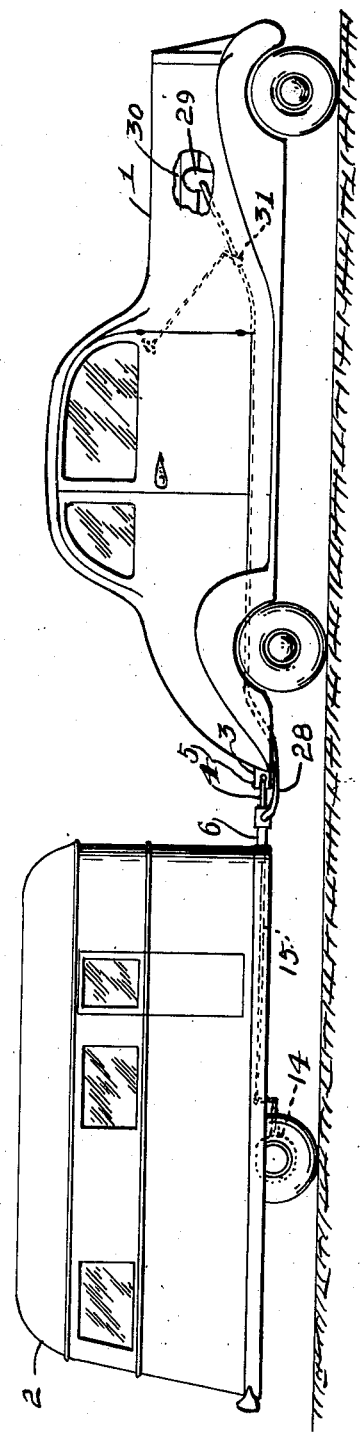
Figure 1 is a side elevation of a tractor and trailer provided with a brake control embodying my invention.

Referring now more particularly to one embodiment of the invention, I show at 1 a passenger automobile and at 2 a house trailer. For the purpose of this disclosure the car 1 is fitted with a coupling part 3 in which the coupling bar 4 is secured by a pin 5.

In effecting my invention I provide a heavy tube 6 and mount the same rigidly on the forward end of the trailer as shown.

The bar 4 is disposed axially within the tube 6, and supported therein by means of spaced bearings as 7. One end of the bar 4 is provided with an eye as 8 to receive the pin 5, and the other end projects slightly beyond the rear end of the tube as indicated at 9.

Fixedly mounted on the bar 4 and adjacent the forward end of the tube, is a flange 10, and bearing against opposite sides of the flange are springs 11 and 12. These springs 11 and 12 also seat upon two of the spaced bearings 7 as shown, and consequently when no force is applied to the bar 4 the oppositely acting springs normally support it in the position shown.

When pulled by the tractor the movement of the bar 4 is in the direction indicated by the arrow 13, and consequently the spring 11 must be heavy because the full force of the pull is exerted upon it. Spring 12, however, need be but a relatively light one because it is only compressed during application of the brakes and its only function is to hold the bar 4 in position against spring 11.

The brakes 14 on trailer 2 are operated through the medium of a rod 15, the rod 15 being pivotally connected as at 16 to a lever 17 fulcrumed as at 18 on the tube 6. One arm, as 19, of the lever 17 extends upwardly over the end of the tube where it is contacted by the adjacent end of bar 4. The result of this construction is that when the bar 4 is moved rearwardly with respect to the tube 6 it operates the lever 17 and through it applies the brakes 14.

This application of the brakes occurs whenever the tractor slows down, or whenever there is a tendency for the trailer to travel faster than the tractor, and of course the power applied to the brakes varies under varying conditions.

If the brakes are applied to the tractor while in motion the momentum acquired by the trailer will carry it forward with respect to the tractor, thereby moving the tube forward with respect to the bar 4 and the brakes on the trailer are applied as above described. The power applied by the brakes is proportionate to the speed of the vehicles and the weight of the trailer, the greater the weight on the trailer the more power is applied to the brakes.

If it is desired to lock the brakes of the trailer in an inoperative position a lock of the type shown in Figure 2 may be used. In this figure a dog 20 is shown pivotally mounted in a chamber 21 on tube 6 as at 22. This dog is normally held in an inoperative position by its weighted end 23 which swings the point 24 upwardly out of the path of travel of the flange 10 on bar 4. The point 24 is moved into engagement with the flange by means of a link 25 connecting the weighted end 23 to a plunger 26 in cylinder 27, the cylinder being connected by a pipe 28 to the intake manifold 29 of engine 30 of the tractor. Pipe 28 is fitted with a valve 31 by means of which it may be opened or closed as desired from the driver's seat. By opening the valve 31 the suction from the engine manifold is permitted to actuate the plunger 26 and throw the point of the dog 24 downwardly and so prevent relative movement of the tube 6 and bar 4 and operation of brakes 14.

In Figure 4 is shown another method of locking the brake operating mechanism in an inoperative position. Here I show the dog 20 moved into an operative position about its pivot 22 by means of a plunger 32, the plunger being moved forwardly by compressed air fed through tube 33. The weighted end 23 is sufficiently heavy to automatically swing the dog 20 into an inoperative position immediately upon release of the air pressure against plunger 32.

In Figure 5 is shown still another method of moving the dog 20 into an operative position. Here I show the weighted end 23 of the dog connected by a link 34 to the core 35 of solenoid 36. The solenoid is in an electric circuit 37 including a switch 38. Upon closing switch 38 the solenoid is energized and the dog swung into the operative position shown.

Figure 3:
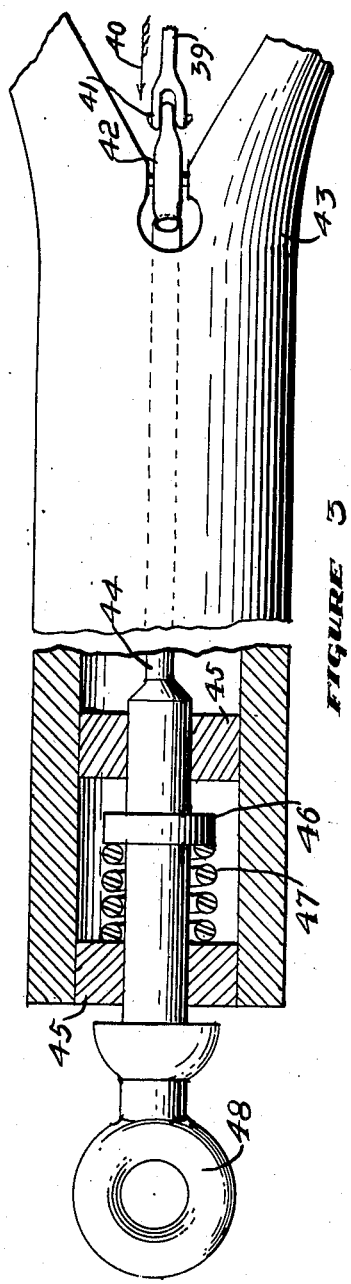
Figure 3 is a sectional view through a portion of a brake control embodying my invention as adapted for use in connection with air brakes, a part being shown in elevation.

In Figure 3 I show a form of the invention as applied to air brakes. In this embodiment the rod 39 operates an air valve, not shown, opening the valve when moved in the direction indicated by the arrow 40. To move the rod in this manner it is connected at 41 to a lever 42 fulcrumed on tube 43. The lever 42 is actuated by means of bar 44 slidably mounted in bearings 45 in tube 43, the bar having a flange 46 thereon. A spring 47 is mounted on the bar 44 to bear against end bearing 45 and flange 46. The tube 43 is, of course, mounted on the trailer, and the bar 44 is provided with an eye at 48 by means of which it is attached to the tractor. Here, the spring 47 is compressed by the forward pull on bar 44 and the air valve, not shown, is closed by the action of its own spring. But as the pull on bar 44 lessens the spring 47 operates to push the bar 44 against the lever 42 and thereby opens the air valve controlling the brakes.

It should be clear from the foregoing that I have provided a control for trailer brakes that is not only automatically operated by the trailer itself, but readily adapts itself to all loads and road conditions, and operates equally well both as a trailer hitch and a trailer-brake control.

It is to be understood, of course, that while I have herein shown and described certain specific embodiments of the invention, changes in form, construction, and method of assembly and operation may be made within the scope of the appended claims.

I claim:

1. A brake mechanism comprising, a tubular member rigidly mountable upon a trailer end and having a bearing disposed in each end thereof and a third bearing disposed therein adjacent the end bearing remote from the trailer end, a push-rod slidably engaging the bearings and passing completely through the tubular member and provided at one end with means for attaching to a tractor, said rod having a flange fixedly mounted thereon between the two adjacent bearings, springs inserted in the tube to bear against the adjacent bearings and opposite sides of the flange, and a lever mounted on the trailer end of the tube, one end of the lever being adapted to be connected to a brake rod and the other end being disposed to contact the adjacent end of the push rod.

2. A brake mechanism comprising, a tubular member rigidly mountable upon a trailer end and having a bearing disposed in each end thereof and a third bearing disposed therein adjacent the end bearing remote from the trailer end, a push-rod slidably engaging the bearings and passing completely through the tubular member and provided at one end with means for attaching to a tractor, said rod having a flange fixedly mounted thereon between the two adjacent bearings, springs inserted in the tube to bear against the adjacent bearings and opposite sides of the flange, and a lever mounted on the trailer end of the tube, one end of the lever being adapted to be connected to a brake rod and the other end being disposed to contact the adjacent end of the push-rod, said tubular member having an overbalanced dog pivotally mounted thereon with one end engageable with the push-rod flange but normally out of engagement therewith, and manually controlled instrumentalities operative to move the dog into engagement with the flange.

3. A brake mechanism comprising, a tubular member rigidly mountable upon a trailer end and having a bearing disposed in each end thereof and a third bearing disposed therein adjacent the end bearing remote from the trailer end, a push-rod slidably engaging the bearings and passing completely through the tubular member and provided at one end with means for attaching to a tractor, said rod having a flange fixedly mounted thereon between the two adjacent bearings, springs inserted in the tube to bear against the adjacent bearings and opposite sides of the flange, an overbalanced dog pivotally mounted on the tubular member with one end engageable with the flange but normally out of engagement therewith, and manually controlled instrumentalities operative to move the dog into engagement with the flange to prevent movement of the push-rod in one direction.

JOHN THERRES.